UNITED STATES PATENT OFFICE.

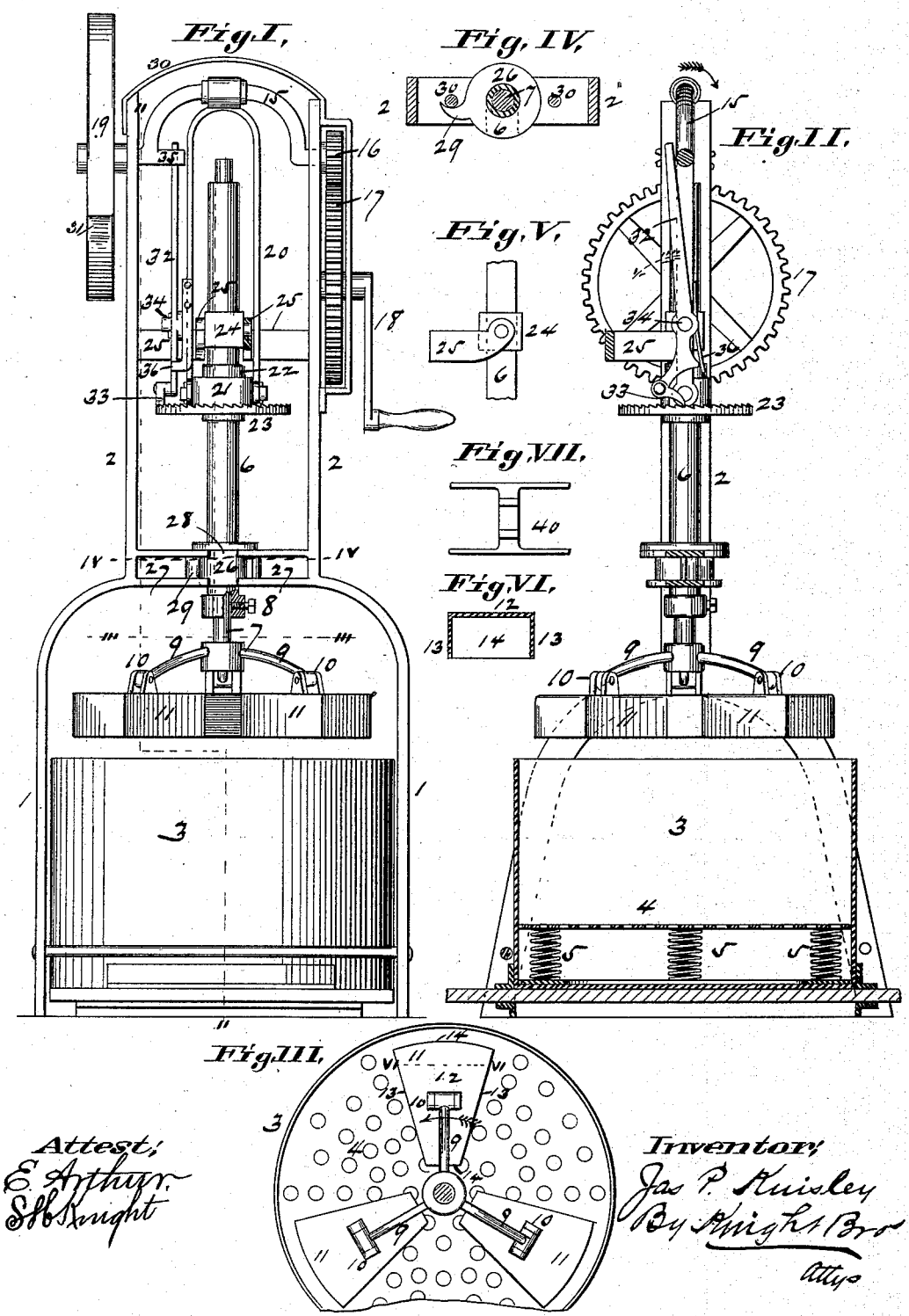

JAMES P. KNISLEY, OF ADRIAN, MISSOURI.

WASHING-MACHINE.

SPECIFICATION forming part of Letters Patent No. 410,109, dated August 27, 1889.

Application filed October 5, 1888. Serial No. 287,315. (No model.)

*To all whom it may concern:*

Be it known that I, JAMES P. KNISLEY, of Adrian, in the county of Bates and State of Missouri, have invented a certain new and useful Improvement in Combined Washing-Machines, Meat and Vegetable Choppers, &c., of which the following is a full, clear, and exact description, reference being had to the accompanying drawings, forming part of this specification, and in which—

Figure I is a side elevation of my improved machine. Fig. II is a vertical longitudinal section taken on line II II, Fig. I. Fig. III is a horizontal transverse section taken on line III III, Fig. I. Fig. IV is a section taken on line IV IV, Fig. I. Fig. V is a detail view showing the manner of connecting the guide-collar to the frame of the machine. Fig. VI is a transverse section through one member of the clothes-pounder head, this section being taken on line VI VI, Fig. III. Fig. VII is a top view of one of the knives or cutters.

My invention relates to an improved machine which may be used for washing clothes or for the purpose of cutting meat or vegetables, &c.; and my invention consists in features of novelty hereinafter fully described, and pointed out in the claims.

Referring to the drawings, 1 represents a lower frame, upon which is mounted a frame consisting of two end pieces or standards 2. Within the frame 1 is located a cylinder 3, as shown. When the device is to be used for washing clothes, a false bottom consisting of a perforated disk 4 is inserted in the cylinder, and beneath this disk springs 5 are placed. When the device is to be used for chopping meat, vegetables, &c., the disk and springs are removed and a block may be inserted in their place.

6 represents a sleeve supported in the standards 2, and within it fits a rod 7, adjustably connected to the sleeve by means of a set-screw 8. On the lower end of and rigidly connected to the rod is a spider 9, to the arms of which are pivoted at 10 the individual members 11, comprising a head that moves vertically within the cylinder 3. Each member in top or bottom view is of the shape shown in Fig. III, and in cross-section of the shape shown in Fig. VI—that is, each member is wedge shape, having a closed top 12, sides 13, and ends 14, and open at bottom.

The head 11 is operated by means of suitable gearing, consisting, preferably, of a crank-shaft 15, journaled in the upper ends of the standards 2, and provided at one end with a pinion 16, meshing into a cog-wheel 17, having a crank 18. On the other end of the crank-shaft is a fly-wheel 19.

Depending from the crank of the shaft is a U-shaped strap 20, on the lower end of which is a collar 21, held upon the sleeve 6 by means of a ring or collar 22 at top and a ratchet-wheel 23 at bottom. This connection allows the sleeve to be turned independently of the collar 21; but when the collar is raised and lowered by turning the shaft 15 the sleeve is likewise raised and lowered, thus operating the head 11 within the cylinder 3.

Above the collar 22 the sleeve 6 is guided and held by a loose collar 24, through which it passes, the collar being supported on angle-arms 25, secured to the respective standards 2. The sleeve 6 is guided beneath the collar 21 by means of a loose collar 26, through which the sleeve passes, this collar being held between cross-strips 27 on the standards 2, and which are divided or cut out at 28.

On the collar 26 is a hook 29. (See Figs. I and IV.) This hook comes against a pin 30 on the cross-strips 27 and prevents the turning of the collar as the sleeve 6 is turned, so that the collar serves as a guide, while permitting the sleeve to move up and down freely. By turning the collar 26 until the hook 29 comes opposite the opening 28 in the cross-strips 27 the collar may be slid up on the sleeve 6, and then the sleeve, the rod 7, which it carries, and the head 11 may be swung out of a vertical position, (the collar 24 turning on its bearing with the cross-strips 25,) and thus the head 11 may be readily examined or cleaned.

For the purpose of continually or constantly changing the head each time it descends into the cylinder, I provide an arrangement for intermittently turning the sleeve 6, consisting of the ratchet-wheel 23, which is rigidly secured to the sleeve, and a lever 32. On the lower end of the lever is a pawl 33. The lever is pivoted to the U-shaped piece or yoke 20 at 34.

On the shaft 15 is an axial projection 35, against which the upper end of the lever 32 impinges as the U-shaped strap or yoke 20 swings over in the upper part of its stroke. This causes the lower end of the lever and pawl 33 to be moved in the direction indicated by the arrow in Fig. II. This causes the ratchet-wheel to be turned the distance of one or more notches, and as soon as the projection passes the lever the latter is moved into a vertical position again by a spring 36, secured to the U-shaped piece 20, and bearing with its free end upon the lower end of the lever 32. It will thus be seen that each time the shaft 15 is turned the ratchet-wheel, and consequently the sleeve 6, rod 7, and head 11, will be turned slightly, and thus the contact between the head and the clothes is constantly changed.

The object of pivoting the members 11 to the spider 9 is to allow them to adjust themselves each time they come in contact with the clothes—that is, should there be a greater thickness of clothes near the outer ends of the members they will tilt on their bearings and produce a uniform pressure upon the clothes from their inner to their outer ends, and in like manner if there is a greater thickness of clothes near their inner ends their outer ends will tilt downward.

The object of the perforated disk or false bottom 4 is to create an upward circulation of water through the clothes each time the head descends. When the head recedes, the springs 5 lift the false bottom and the water collects in the chamber beneath the bottom, and then when the head descends again this water is caused to pass or circulate upwardly through the clothes.

The members 11 of the head may be removed at will and be substituted by knives or cutters 40, as shown in Fig. VII, these knives being used for cutting meat, vegetables, &c., and it will thus be seen that with a very small amount of work the device may be changed from a clothes pounder or washer into a meat or vegetable chopper.

The standards 2 may be connected at top by an arch 30, if desired, and the fly-wheel 19 may be provided with a weight 31 on its rim to avoid dead-centers as usual.

I claim as my invention—

1. The combination of the cylinder 3, having an open top and a head for entering the cylinder, and means for operating the head, said head consisting of a spider 9, members 11, having lugs and pivots passing through the lugs and the ends of the spider close up to the members 11, substantially as set forth.

2. The combination, with the cylinder 3, of a head consisting of the spider 9 and members 11, and means for operating the head, consisting of a sleeve 6, rod 7 within the sleeve, set-screw passing through the sleeve and adjustably retaining the rod 7, suitable gearing, and connection between the gearing and the sleeve, substantially as set forth.

3. The combination of a cylinder 3, a head for entering the cylinder, a rod carrying said head, ratchet-wheel 23, collar 21 above the latter surrounding and rotatable on said rod, but reciprocating therewith, pawl 33, lever 32, crank-shaft 15, having axial projection 35, a yoke pivoted to the crank-shaft and said collar for reciprocating the rod, collar, and ratchet-wheel together, and mechanism for rotating the crank-shaft, substantially as set forth.

4. The combination of the cylinder 3, a head for entering the cylinder, rod 7, sleeve 6, cross-strip 27, collar 26, having a hook or horn 29, collar 24, and cross-strip 25, all substantially as and for the purpose set forth.

5. The combination of the cylinder 3, a head for entering the cylinder, a reciprocating rod carrying said head, a bottom guide-piece, said rod being removable therefrom, and an upper pivoted collar or guide-piece, through which the upper end of the rod projects, substantially as and for the purposes set forth.

JAMES P. KNISLEY.

In presence of—
C. L. MILLS,
J. SCUDDER.